Patented Mar. 29, 1949

2,465,912

UNITED STATES PATENT OFFICE 2,465,912

POLYALKYLATED MONOCHLORO CYCLIC SULFONES

Rupert C. Morris, Berkeley, and John L. Van Winkle, San Lorenzo, Calif., assignors to Shell Development Company, San Francisco, Calif., a corporation of Delaware No Drawing. Application January 26, 1946, Serial No. 643,834

2 Claims. (Cl. 260—329)

This invention relates to a novel and particularly useful class of compounds comprising the polyalkylated monochloro cyclic sulfones. More particularly, the invention pertains to polyalkylated monochlorosulfolanes. A particularly valuable group of compounds comprises the monochloro-2,4-dialkylsulfolanes and monochloro-2,4-dialkylsulfolenes.

The term "sulfolane," as employed herein, refers to a structure containing four saturated carbon atoms and a sulfur atom in a five-membered heterocyclic nucleus, the carbon atoms each being attached to two hydrogen atoms, and the sulfur atom having two oxygen atoms attached thereto. The structural formula of the simple unsubstituted sulfolane is

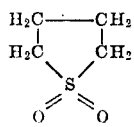

This compound is otherwise known as thiacyclopentane-1,1-dioxide, thiolane-1,1-dioxide, cyclotetramethylene sulfone, and dihydrobutadiene sulfone. The derivative term "sulfolanyl," as employed herein and in the appended claims, refers to those sulfolane compounds wherein one or more of the hydrogen atoms attached to the carbon atoms of the nucleus is replaced by an equivalent number of substituents other than hydrogen. The term "sulfolene," as employed herein, also refers to a structure containing four carbon atoms and a sulfur atom in the ring, two of the carbon atoms being saturated whereas the two remaining carbon atoms are linked by a double bond. The remaining free bonds of the nuclear carbon atoms are attached to hydrogen atoms, and the sulfur atom has two oxygen atoms attached thereto. Similarly, the expression "sulfolenyl" refers to those compounds wherein one or more of the hydrogen atoms of the sulfolene compound is replaced by a corresponding number of other substituents than hydrogen.

The novel monochloro-polyalkylsulfolanes of the invention contain a five-membered heterocyclic ring consisting of four saturated nuclear carbon atoms and a sulfonyl radical, have at least two alkyl radicals directly attached to one or more of the nuclear carbon atoms, and have one of the nuclear carbon atoms directly attached to a chlorine atom, the remaining free bonds of the nuclear carbon atoms being directly attached to a member of the group consisting of the hydrogen atom and the hydrocarbon radicals. The monochloro-polyalkylsulfolanes may be represented by the formula

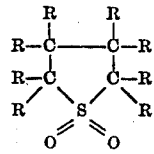

wherein one of the R's is a chlorine atom, at least two of the R's are alkyl radicals, and the remaining R's are members of the group consisting of the hydrogen atom and the hydrocarbon radicals.

A valuable group of polyalkyl cyclic sulfone monochlorides of the invention comprises those compounds containing a five-membered heterocyclic ring consisting of four nuclear carbon atoms and a sulfonyl radical and having two alkyl radicals directly attached to two different nuclear carbon atoms, preferably in the 2- and 4-positions, wherein one of the four nuclear carbon atoms is directly attached to a chlorine atom and wherein the remaining free bonds of the nuclear carbon atoms are directly attached to hydrogen atoms.

The alkyl radicals which are directly attached to the cyclic sulfone nucleus are preferably lower alkyl radicals containing not more than four carbon atoms, i.e. the methyl, ethyl, propyl, isopropyl, n-butyl, sec-butyl and tert-butyl radicals. However, useful compounds are also formed wherein alkyl radicals containing more than four carbon atoms are directly attached to the cyclic sulfone nucleus. Examples of the higher alkyl radicals are amyl, hexyl, isoamyl, 2-methylamyl, heptyl, octyl, stearyl and the like.

The hydrocarbon radicals which may be directly attached to one or more nuclear carbon atoms are monovalent radicals which may be cyclic or acyclic, saturated, unsaturated or aromatic, such as the alkyl, alkenyl, aryl, alkaryl, alkenaryl, aralkyl, aralkenyl cycloalkyl and cycloalkenyl radicals. Suitable hydrocarbon radicals are methyl, ethyl, propyl, isopropyl, butyl, sec-butyl, tert-butyl, amyl, hexyl, cyclohexyl, cyclohexenyl, 3,5,5-trimethyl-2-cyclohexenyl, 3,5,5-trimethyl-3-cyclohexenyl, 3,3,5-trimethyl-cyclohexyl, vinyl, isopropenyl, allyl, methallyl, crotyl, tiglyl, cinnamyl, phenyl, benzyl, cresyl, xylyl, styryl, naphthyl, cyclopentadienyl, propargyl, and the like and their homologues. Valuable compounds are represented when the hydrocarbon radicals which are directly attached to the nuclear carbon atoms are of saturated character, i.e. not readily hydrogenatable, such as the alkyl, cycloalkyl, aryl, aralkyl and alkaryl radicals, and more preferably the alkyl radicals. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethylcyclohexyl.

Polyalkylsulfolanyl monochlorides having the chlorine atom on the nuclear carbon atom in the 3-position and having an alkyl group on each of the nuclear carbon atoms in the 2- and 4-positions, possess unexpectedly valuable properties which make them of particular use in various industrial applications. An example of a particularly valuable 3-chloro-2,4-dialkylsulfolane is 3-chloro-2,4-dimethylsulfolane.

The numbering system of the sulfolane ring is indicated below:

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure

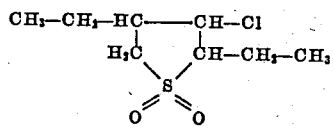

which is termed 3-chloro-2,4-diethylsulfolane.

Compounds of the type of 3,4-dibromo-3,4-dimethylsulfolane are disclosed in the prior art. None of these compounds contains but one halogen atom attached to polyalkylated cyclic sulfone nucleus which has the remaining free bonds of the nucleus attached to hydrogen atoms or hydrocarbon radicals. Novel compounds have now been prepared wherein the polyalkylsulfolane nucleus has but one chlorine atom directly attached to a nuclear carbon atom, the remaining free bonds of the nuclear carbon atoms being directly attached to hydrogen atoms or hydrocarbon radicals. Surprisingly, it has been found that the polyalkylsulfolanyl monochlorides of the invention, and particularly the 3-chloro-2,4-dialkylsulfolanes, possess inherent properties which are markedly superior to those of the halogenated cyclic sulfones having directly attached to the nucleus, in addition to one chlorine atom, substituents other than hydrogen atoms and hydrocarbon radicals. These properties could not be foreseen, and they are of such a nature as to make the compounds of the invention particularly useful in various industrial applications.

The monochloro dialkylsulfolanes of the invention may be prepared by any suitable method. A preferred method is to hydrogenate the corresponding monochloro dialkylsulfolene compound, preferably in the presence of a catalyst which is not poisoned by chlorine or chlorine-containing compounds, e. g. platinum. The monochloro dialkylsulfolanes are also prepared by reacting the corresponding monohydroxy dialkylsulfolane with POCl₃ or SOCl₂. It has been found that a monochlorodialkylsulfolene is conveniently prepared by reacting chlorine with a dialkylsulfolene having at least one of the alkyl groups on one of the unsaturated carbon atoms, e.g. a 2,4-dialkyl-3-sulfolene or a 3,4-dialkyl-3-sulfolene, in an essentially anhydrous solution. For example, when chlorine is added to an anhydrous solution of a 2,4-dialkyl-3-sulfolene, a 3-chloro-2,4-dialkyl-4-sulfolene is produced; a 3,4-dialkyl-3-sulfolene is reacted with chlorine to produce a 3-chloro-3,4-dialkyl-4-sulfolene. A suitable solvent, such as carbon tetrachloride or chloroform may be present, which is substantially inert to the reactants and/or products under the conditions of the reaction, and it should be present in amounts sufficient to bring about solution of at least parts of the reactants but not enough to cause excessive dilution or in any other way to interfere with the reaction. In forming the monochloro dialkylsulfolene, it has been found desirable to maintain a temperature below about 50° C. and preferably below about 35° C. In some cases, particularly good results are obtained by not allowing the temperature to rise above about 0° C.

The dialkylsufolene which is to be reacted with chlorine is prepared by reacting the corresponding conjugated diene of at least six carbon atoms with sulfur dioxide. For example, 3,4-dimethyl-3-sulfolene is prepared by reacting sulfur dioxide and 2,3-dimethylbutadiene; and 2,4-dimethyl-3-sulfolene is formed by the reaction of sulfur dioxide and 4-methylpentadiene or 2-methylpentadiene.

Another suitable method for preparing the monochloro dialkylsulfolenes comprises reacting sulfur dioxide with the appropriate conjugated diolefinic compound having one of the unsaturated carbon atoms linked to a chlorine atom. This reaction may be represented by the general equation

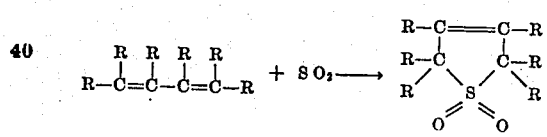

wherein one of the R's is a halogen atom, two of the R's are alkyl radicals and the remaining R's are hydrogen atoms.

The novel monochloro polyalkylsulfolanes of the invention find utility in a large variety of industries. For example, the monochloro dialkyl compounds may be used as insecticides, fungicides and parasiticides or as ingredients of insecticidal, fungicidal and parasitical compositions, and as ingredients for use in the manufacture of varnishes, polishes, and the like. Also, these novel compounds may be employed in the preparation of natural or synthetic rubbers, resins, plastics, etc., and they are of value in the resin and lacquer industry as plasticizers for the manufacture of dopes, fabric coatings, sprays and moulding compositions. The monochloro polyalkylated cyclic sulfones are of use as antioxidants, pourpoint depressants, ingredients in cosmetics, as base materials and fixing agents in the preparation of perfumes, and as softening agents for the leather industry. Moreover, the monochloro polyalkylsulfolanes may be further reacted, e.g. sulfurized, sulfated, or the like, to produce valuable substances to be used as addition agents in lubricating oils, greases, and as detergents, as well as for a variety of other purposes.

The monochloro dialkyl cyclic sulfones and more particularly the monchloro 2,4-dialkylsulfolanes are of particular value as fire-resistant plasticizers for natural and synthetic rubbers, resins and plastics. Moreover the 3-chloro-2,4-dialkylsulfolanes are exceptionally valuable as intermediates in the synthesis of ethers, esters, nitriles, amines and the like.

The following examples serve to illustrate the invention.

Example I

Chlorine was slowly added to a stirred solution of about 292 grams of 2,4-dimethyl-3-sulfolene in approximately 1500 cc. of carbon tetrachloride. The mixture was cooled so that a temperature of about 0° C. was maintained. After no further chlorine was taken up, the reaction mixture was further treated to recover 3-chloro-2,4-dimethyl-4-sulfolene having a melting point of 108.8° C. to 109.8° C. and boiling at 131° C. to 138° C. at 4 mm. pressure.

Example II

To a solution of 3,4-dimethyl-3-sulfolene in chloroform there was added chlorine at such a rate that the temperature did not go above about 30° C. to 35° C. The recovered 3-chloro-3,4-dimethyl-4-sulfolene has a melting point of 79.6° C. to 80.0° C.

Example III

Following the procedure described in Example I, chlorine is reacted with a solution of 2,4-diethyl-3-sulfolene in carbon tetrachloride to produce 3-chloro-2,4-diethyl-4-sulfolene.

Example IV

When chlorine is passed through a solution of 2-methyl-4-ethyl-3-sulfolene in chloroform according to the process of Example II, 3-chloro-2-methyl-4-ethyl-4-sulfolene is formed.

Example V 5-chloro-4-methyl-2,4-pentadiene is treated with approximately an equimolar amount of sulfur dioxide in the presence of pyrogallol at a temperature between about 95° C. and about 105° C. to obtain 5-chloro-2,4-dimethyl-3-sulfolene.

Example VI

Sulfur dioxide is added to approximately an equimolar amount of 2-chloro-4-ethyl-2,4-pentadiene in the presence of pyrogallol at a temperature between about 95° C. and about 105° C., and 2-chloro-2-methyl-4-ethyl-3-sulfolene is recovered from the reaction mixture.

Example VII 3-chloro-2,4-dimethyl-4-sulfolene prepared as described in Example I is treated with hydrogen in the presence of platinum to produce 3-chloro-2,4-dimethylsulfolane.

Example VIII

Hydrogen is reacted with 3-chloro-3,4-dimethyl-4-sulfolene in the presence of a platinum catalyst, and 3-chloro-3,4-dimethylsulfolane is recovered.

According to the general procedures outlined above, the following novel compounds are also prepared: 2-chloro-3,4-dimethylsulfolane, 2-chloro-2,4-dimethylsulfolane, 3-chloro-2,4,5-triethylsulfolane, and 2-chloro-2,3,4-trimethylsulfolane.

We claim as our invention:

1. The compound having the structural formula

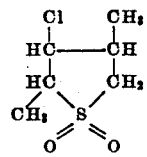

2. A compound having the structural formula

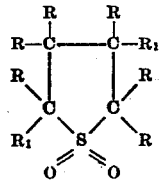

where one of the R's is a chlorine atom and the remaining R's are hydrogen atoms, and where the $R_1$'s are alkyl radicals.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,357,344 | Morris et al. | Sept. 5, 1944 |

OTHER REFERENCES

Backer et al.: Rec. Trav. Chim., 58, 781 (1939).